Nov. 16, 1965  F. K. H. NALLINGER  3,218,054
LEAF SPRING ARRANGEMENT
Filed June 25, 1963
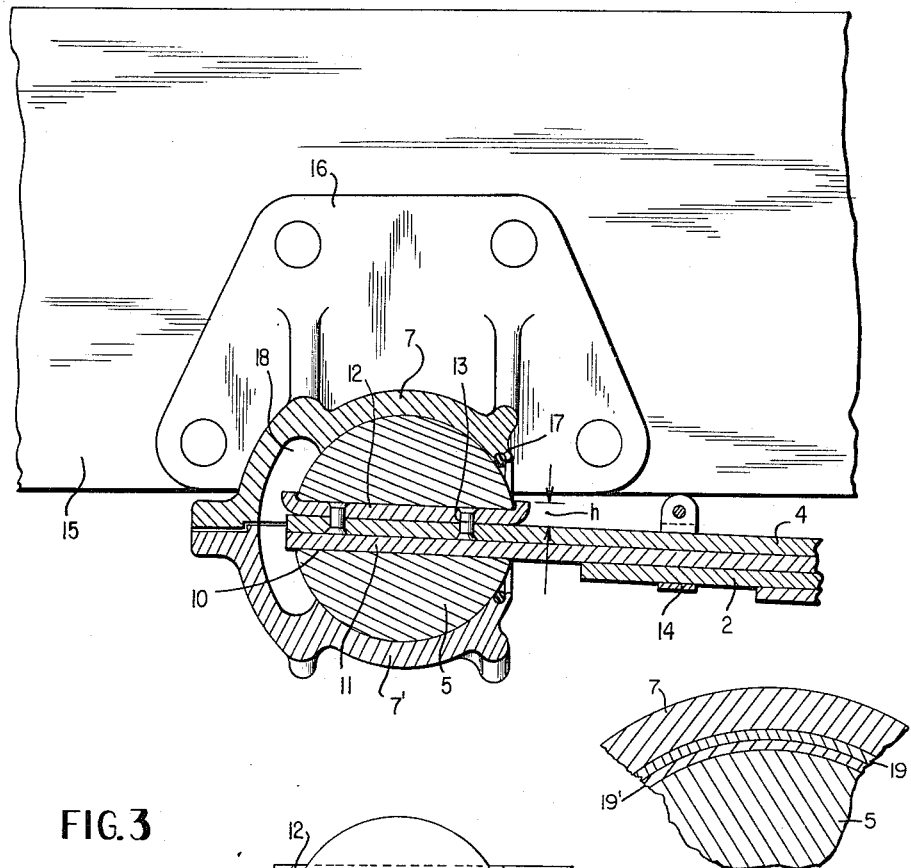
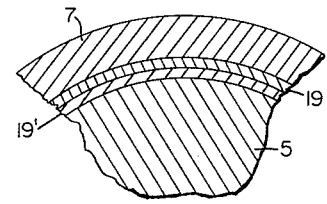
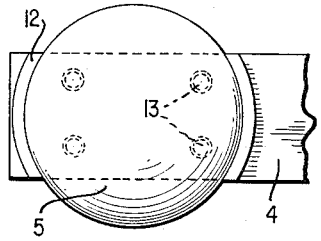
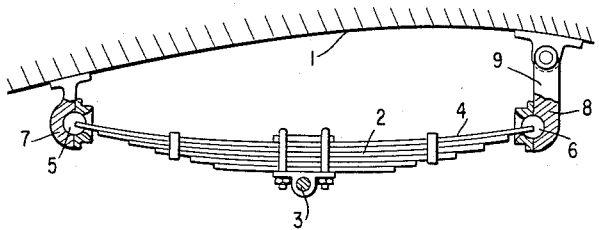
INVENTOR.
FRIEDRICH K. H. NALLINGER
BY Dicke + Craig
ATTORNEYS.

United States Patent Office 3,218,054
Patented Nov. 16, 1965

3,218,054
LEAF SPRING ARRANGEMENT
Friedrich K. H. Nallinger, Stuttgart, Germany, assignor to Daimler-Benz Aktiengesellschaft, Stuttgart, Unterturkheim, Germany
Filed June 25, 1963, Ser. No. 290,535
Claims priority, application Germany, June 28, 1962, D 39,239
9 Claims. (Cl. 267—54)

The present invention relates to a leaf spring arrangement, and more particularly to longitudinal leaf spring assemblies for motor vehicles and to the end supports thereof at the motor vehicle by means of ball joints which permit a reliable connection between the ball member and the spring that may be readily installed and is also readily detachable again.

Known heretofore in the prior art were leaf spring packets or packs at motor vehicles, disposed in the vehicle longitudinal direction, with which special measures were taken in order to prevent a twisting, especially of the upper connecting spring leaf. With such arrangements are preferred either cardan-like swinging suspensions with two pivot pins crossing one another at right angle or swinging joints with a ball-shaped bearing at the upper swinging or pivot suspension. For the same purposes, the leaf ends have also been supported already between rubber blocks. However, the cardan-type suspensions are complicated from a structural point of view and permit an unconstrained deflection only in two planes. The pivotal or swinging suspensions with upper spherically-shaped bearings permit an unconstrained pivot or swinging suspension but not a direct rotation of the spring leaf at the height of its suspension. The mounting by means of rubber blocks are, by reason of the occurring pressing and squeezing work, subjected to a strong wear and therefore are exposed to premature destruction.

The present invention eliminates the aforementioned disadvantages and essentially consists in supporting the connecting ends of the spring leaves directly within a ball joint. The guidance of the spring ends by means of the ball joint is unambiguous and unequivocal, practically is subjected hardly to any wear and the movability thereof is unconstrained in all directions. Particularly, a rotation of the spring directly about the straight line determined by the pivotally connected ends is possible by the arrangement according to the present invention.

The present invention further consists in that the spring end secured at the ball joint extends through a relatively low rectangular aperture of the ball-shaped member and is secured by means of a U-shaped member fastened to the spring and surrounding or extending over the boundary edge of one of the wide sides of the aperture and by means of a second spring leaf inserted into the aperture on the side opposite the U-shaped member.

Accordingly, it is an object of the present invention to provide a longitudinal leaf spring arrangement which avoids, by simple means, the shortcomings and inadequacies encountered in the prior art constructions.

It is another object of the present invention to provide a longitudinally disposed leaf spring assembly which prevents, by simple means, any twisting of the upper connecting spring leaf, which is simple in construction and permits substantially unconstrained deflections thereof in all directions.

It is still another object of the present invention to provide mountings for the ends of leaf spring assemblies which fulfill the requirements mentioned hereinabove without excessive wear and premature destruction of the connecting joints.

Still a further object of the present invention resides in the provision of a pivotal mounting for the ends of leaf springs disposed in the longitudinal direction of the vehicle which permits limited rotation and/or twisting of the spring about its axis, is reliable in operation and may be readily installed.

Still another object of the present invention resides in the provision of a connection between the ball joint and the swingably supported spring leaf which may be assembled in a simple manner and is again readily detachable.

These and other objects, features and advantages of the present invention will become more obvious from the following description when taken in connection with the accompanying drawing which shows, for purposes of illustration only, one embodiment in accordance with the present invention, and wherein:

FIGURE 1 is a schematic, side elevational view of a longitudinally arranged leaf spring assembly in accordance with the present invention that is pivotally supported at the vehicle superstructure, FIGURE 2 is an elevational view on an enlarged scale, partially in cross section, of the details of a ball joint connection for a leaf spring at a motor vehicle frame longitudinal bearer member in accordance with the present invention, and FIGURE 3 is a partial plan view on the leaf spring end provided with the ball-shaped bearing member.

FIGURE 4 is a sectional view of a portion of the bearing surfaces of the ball connection showing self-lubricating linings therefor.

Referring now to the drawing wherein like reference numerals are used throughout the various views to designate like parts, and more particularly to FIGURE 1, reference numeral 1 designates therein the vehicle superstructure which may be formed by the vehicle frame or a part of a self-supporting type body construction, and reference numeral 2 generally designates therein a leaf spring bundle which supports or carries the vehicle axle 3. According to the present invention, one spherically-shaped member 5 and 6 each, forming part of a respective ball joint 5, 7 and 6, 8, is suitably secured a corresponding end of the connecting spring leaf 4 of the leaf spring assembly 2, for example, by welding, riveting, forging, bolting, or the like, preferably however, in the manner to be described more fully hereinafter. The spherically-shaped member 5 at one end of the connecting spring 4 is received within a ball-shaped socket 7 of a bearing arm supported at the vehicle superstructure 1. The ball-shaped bearing socket 8 for the spherically-shaped member 6 at the other end of connecting spring 4 is pivotally supported by means of a swinging shackle 9 at the vehicle superstructure 1. However, the swinging or pivotal support 8, 9 may also be replaced by a sliding ring guide arrangement, or both bearings 7, 8 may be arranged so as to be pivotally or slidably movable. Additionally, either the bearing sockets 7 and 8 may be lined with a self-lubricating plastic or the ball members 5 and 6 may be coated with a self-lubricating plastic or both ball members 5 and 6 themselves may be made of plastic material having self-lubricating properties. A separate lubrication of the ball joint is thereby dispensed with.

As shown in FIGURE 2, which illustrates a particularly advantageous and appropriate pivotal mounting of the end of the connecting spring leaf in the ball joint, the ball member 5 has a larger diameter than the width of the ends of the spring leaves 4 and 11 to be connected therewith. Additionally, the ball member 5 is provided with a shallow aperture 10 extending completely therethrough which is not quite as high as three superposed or stacked spring leaves and which is exactly wide as the spring leaves. A flat U-shaped member 12 which is of the same thickness as any one of the two equally thick spring leaves 4 or 11 is secured, for example, by rivets 13, to and on top of the spring leaf end of the upper spring leaf 4 of the two spring leaf ends 4 and 11 inserted into the aperture 10. The web portion of the U-shaped member 12 is exactly so thick that with the spring leaves 4 and 11 inserted into the space of the aperture 10, it just fills the space remaining between these spring leaves 4 and 11 and the wall of the aperture 10. The height of the member 12 including its up-turned edges imparting the aforesaid U-shape is, as indicated by the space $h$ between the arrows as shown in FIGURE 2, slightly greater than the thickness of the spring leaf.

The arrangement so far described and illustrated in connection with FIGURES 2 and 3 of the drawing makes it possible to initially extend the spring leaf end 4 together with the U-shaped member 12 through the aperture 10 and to prevent by the subsequent insertion of the spring end 11 below the assembly 12, 4, any unintentional withdrawal again on the part of the spring end 4 out of the aperture 10. Thereafter, the next following spring leaf 2 is secured at the spring leaves 4 and 11, for example, by means of a small bolted shackle or bracket 14 or by means of clamps. Otherwise, the spring leaves are kept together by the conventional spring clamps, well known per se, and therefore not shown in the drawing in detail.

The ball member 5 is supported within a two-partite ball socket 7, 7' and the latter is secured, for example, at a vehicle longitudinal bearer member 15 by means of a securing plate 16. The two socket halves 7 and 7' are secured to one another, for example, by means of a threaded connection of any suitable form. The ball socket 7, 7' is provided with an annular seal 17 at the side where the spring leaves project outwardly therefrom. Possibly, a lubricating space 18 may be provided directly adjoining the ball bearing surfaces of the socket if one does not provide the bearing surfaces of the socket or of the ball member surface with a self-lubricating lining or coating 19, 19' as shown in FIGURE 4 which obviates any special maintenance and service of the pivotal spring connection.

While I have shown and described one embodiment in accordance with the present invention, it is understood that the same is not limited thereto, but is susceptible of numerous changes and modifications within the spirit and scope thereof, and I therefore do not wish to be limited to the details shown and described herein but intend to cover all such changes and modifications as are encompassed by the scope of the appended claims.

I claim:
1. A ball joint support for supporting leaf springs at relatively fixed parts, especially for leaf springs in motor vehicles which extend approximately in the longitudinal direction of the vehicle, comprising:
   leaf springs means including a plurality of spring leaves and ball joint means directly connecting each end of said leaf spring means with said relatively fixed part,
   said ball joint means each including spherically-shaped bearing means and complementary socket means,
   said spherically-shaped means being provided with a relatively shallow substantially rectangular aperture extending completely through a respective spherically-shaped means for securing therein said leaf spring means, and means for securing the end of said spring leaves in said aperture including a substantially U-shaped member fastened to one spring leaf of said plurality of spring leaves and extending with the leg portions thereof about the boundary edges of one wide side of said aperture and another spring leaf inserted into said aperture on the side of said one spring leaf opposite said U-shaped member.

2. A ball joint support for supporting leaf springs at relatively fixed parts, especially for leaf springs in motor vehicles which extend approximately in the longitudinal direction of the vehicle, comprising:
   leaf spring means including a plurality of spring leaves, and ball joint means directly connecting each end of said leaf spring means with said relatively fixed part,
   said ball joint means each including spherically-shaped bearing means and complementary socket means,
   said spherically-shaped means being provided with a relatively shallow substantially rectangular aperture extending completely through a respective spherically-shaped means for securing therein said leaf spring means, and means for securing the end of said spring leaves in said aperture including a substantially U-shaped member fastened to one spring leaf of said plurality of spring leaves and extending with the leg portions thereof about the boundary edges of one wide side of said aperture and another spring leaf inserted into said aperture on the side of said one spring leaf opposite said U-shaped member,
   the aperture provided in the spherically-shaped means being of substantially the same width as the ends of the spring leaves to be inserted therein, and being of a height slightly less than three superposed spring leaves of substantially equal thickness, and said U-shaped member being of a greater height than the thickness of an individual spring leaf, and the web portion of said U-shaped member being of such thickness that the U-shaped member just fills the space between two superposed spring leaves and the walls of a respective aperture in order to enable initial insertion into the aperture of said one spring leaf together with the U-shaped member, subsequent locking of the same by insertion of the said another spring leaf, and retention thereby of both said last-mentioned spring leaves in said aperture.

3. A ball joint support according to claim 2, further comprising clamping means disposed in proximity to a ball joint means for clamping together the said one spring leaf, the said another spring leaf and the spring leaf disposed directly adjacent the said another spring leaf opposite the said one spring leaf.

4. A ball joint support according to claim 3, wherein said socket means is a two-partite socket assembly, and flange means for securing said two-partite socket assembly at said relatively fixed part.

5. A ball joint support according to claim 4, further comprising means forming a space for lubricant adjoining said socket means.

6. A ball joint support according to claim 5, further comprising annular seal means between said ball means and said socket means on the side on which the spring leaves extend outwardly from said aperture.

7. A ball joint support according to claim 6, further comprising a self-lubricating coating adhering to the mutually contacting facing bearing surfaces of said spherically-shaped bearing means and said complementary socket means.

8. A ball joint support according to claim 1, further comprising clamping means disposed in proximity to said ball joint means for clamping together the said one spring leaf, the said another spring leaf and the spring leaf disposed directly adjacent the said another spring leaf opposite the said one spring leaf.

9. A ball joint support according to claim 1 wherein said socket means is a two-partite socket assembly, and flange means for securing said two-partite socket assembly at said relatively fixed part.

References Cited by the Examiner

UNITED STATES PATENTS

| | | | |
|---|---|---|---|
| 1,536,981 | 5/1925 | Stossel | 267—54 |
| 1,598,679 | 9/1926 | Fletcher et al. | 267—54 |
| 1,731,765 | 10/1929 | Coppock | 267—54 |
| 1,860,280 | 5/1932 | Fletcher | 267—54 |
| 1,872,311 | 8/1932 | Lyman | 267—54 |
| 2,878,046 | 3/1959 | Latzen. | |
| 2,905,492 | 9/1959 | Alexander | 287—87 |
| 3,106,991 | 10/1963 | Winge. | |

FOREIGN PATENTS 418,248   8/1925   Germany.

OTHER REFERENCES

"Product Engineering," March 3, 1958, "Nylon Clad," by Penney and Blockhoff, pages 52-54.

ARTHUR L. LA POINT, *Primary Examiner.*